US008763705B2

(12) United States Patent
Ali et al.

(10) Patent No.: US 8,763,705 B2
(45) Date of Patent: Jul. 1, 2014

(54) COMPOSITIONS AND METHODS FOR CLEANING A WELLBORE PRIOR TO CEMENTING

(75) Inventors: Syed Ali, Sugar Land, TX (US); Juan Carrasquilla, Le Plessis Robinson (FR); Bruno Drochon, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 572 days.

(21) Appl. No.: 13/071,867

(22) Filed: Mar. 25, 2011

(65) Prior Publication Data

US 2012/0241155 A1 Sep. 27, 2012

(51) Int. Cl.
*E21B 37/00* (2006.01)
*E21B 21/00* (2006.01)
*E21B 33/13* (2006.01)

(52) U.S. Cl.
USPC .......................... 166/312; 166/305.1; 166/285

(58) Field of Classification Search
None
See application file for complete search history.

(56) References Cited

U.S. PATENT DOCUMENTS

| | | | |
|---|---|---|---|
| 5,830,831 A | 11/1998 | Chan et al. | |
| 5,874,386 A | 2/1999 | Chan et al. | |
| 5,904,208 A | 5/1999 | Ray et al. | |
| 6,283,213 B1 | 9/2001 | Chan | |
| 6,534,449 B1 | 3/2003 | Gilmour et al. | |
| 7,318,477 B2 | 1/2008 | Hou | |
| 7,380,606 B2 | 6/2008 | Pursley et al. | |
| 7,392,844 B2 | 7/2008 | Berry et al. | |
| 7,481,273 B2 | 1/2009 | Javora et al. | |
| 7,544,639 B2 | 6/2009 | Pursley et al. | |
| 7,833,943 B2 | 11/2010 | Van Zanten et al. | |
| 2002/0125010 A1 | 9/2002 | Collins et al. | |
| 2003/0166472 A1* | 9/2003 | Pursley et al. | 507/200 |
| 2006/0073986 A1 | 4/2006 | Jones et al. | |
| 2006/0096758 A1 | 5/2006 | Berry et al. | |
| 2006/0258541 A1 | 11/2006 | Crews | |
| 2007/0244015 A1 | 10/2007 | Crews et al. | |
| 2007/0295368 A1 | 12/2007 | Harrison | |
| 2008/0274918 A1 | 11/2008 | Quintero et al. | |
| 2008/0287324 A1 | 11/2008 | Pursley et al. | |
| 2009/0008091 A1 | 1/2009 | Quintero et al. | |
| 2009/0137432 A1 | 5/2009 | Sullivan et al. | |
| 2009/0200033 A1 | 8/2009 | Kakadjian et al. | |
| 2009/0221456 A1 | 9/2009 | Harrison et al. | |
| 2009/0281004 A1 | 11/2009 | Ali et al. | |
| 2010/0081587 A1 | 4/2010 | van Zanten et al. | |
| 2010/0137168 A1 | 6/2010 | Quintero et al. | |
| 2010/0263863 A1* | 10/2010 | Quintero et al. | 166/267 |

FOREIGN PATENT DOCUMENTS

WO 2006/124826 A1 11/2006
WO 2007/011475 1/2007

OTHER PUBLICATIONS

"Sorbitan esters" Mosselman Oleochemicals, retrieved Oct. 21, 2013 from http://images.mosselman.be/sorbitan_esters.pdf, dated Sep. 23, 2013.*
International Search Report for the equivalent PCT patent application No. PCT/EP12/054958 issued on Jun. 14, 2012.
Smith, G., Kumar, P. and Nguyen, D.: "Formulating Cleaning Products with Microemulsion," paper No. 164, Proceedings 6th World Congress CESIO, Berlin, Germany, Jun. 21-23, 2004.
Van Zanten, R., Lawrence, B., and Henzler, S.: "US ing Surfactant Nanotechnology to Engineer Displacement Packages for Cementing Operations," paper IADC/SPE 127885, 2010.
S. Ezrahi, A. Aserin and N. Garti, "Chapter 7: Aggregation Behavior in One-Phase (Winsor IV) Microemulsion Systems," in P. Kumar and K. L. Mittal, ed., Handbook of Microemulsion Science and Technology, Marcel Dekker, Inc., New York, 1999, pp. 185-246.

* cited by examiner

*Primary Examiner* — Angela M DiTrani
(74) *Attorney, Agent, or Firm* — Michael Dae

(57) ABSTRACT

Wellbore-cleaning compositions comprising microemulsions are useful during cementing operations. The microemulsion solvent may be selected from the group comprising methyl esters and ethoxylated alcohols. The microemulsion surfactants comprise a water-wetting surfactant, a cleaning surfactant, an emulsifying surfactant, a non-ionic surfactant and a non-ionic co-surfactant. The wellbore-cleaning compositions may be pumped alone, ahead of a conventional spacer fluid or scavenger slurry and behind a conventional spacer fluid or scavenger slurry. In addition, the wellbore-cleaning composition may be incorporated into a carrier fluid such as (but not limited to) a conventional spacer fluid or scavenger slurry. The resulting fluid mixture may be pumped as a spacer fluid.

12 Claims, 2 Drawing Sheets

COMPOSITIONS AND METHODS FOR CLEANING A WELLBORE PRIOR TO CEMENTING

BACKGROUND

This disclosure relates generally to compositions and methods for treating a subterranean well prior to or during cementing operations. More specifically, the present disclosure relates to compositions and methods for cleaning casing and wellbore surfaces with fluids comprising a microemulsion.

Some statements may merely provide background information related to the present disclosure and may not constitute prior art.

The use of oil or synthetic-based drilling fluid (SBM/OBM) is widespread in many areas for a variety of reasons, including excellent shale inhibition, high rates of penetration and high lubricity. Oil- or synthetic-based drilling fluids generally comprise invert emulsion fluids, where the continuous or external phase is predominantly organic (e.g., mineral oil or synthetic oil), and the inverse or internal phase is usually aqueous (e.g., brines). The stability of invert emulsions is generally maintained by one or more additives present in the fluid, such as emulsifiers, emulsion stabilizing agents, and oil-wetting agents.

When drilling is performed with SBM/OBM fluids, the wellbore becomes oil-wet. Prior to cementing, the casing also becomes oil-wet while being run into the hole. This condition commonly results in poor bonding between the set cement and the casing and wellbore surfaces. Poor cement bonding may compromise the hydraulic seal in the annulus, potentially resulting in fluid communication between subterranean zones and potentially loss of the well integrity. Therefore, to ensure successful cementing, two conditions are necessary: (1) the SBM/OBM is effectively displaced and/or removed from the borehole; and (2) the wellbore-wall and casing surfaces are water-wet. Failure to satisfy Condition 1 may cause contamination of the cement slurry, and the cement performance may suffer. Failure to satisfy Condition 2 may lead to poor bonding between the cement and the borehole-wall and casing surfaces.

Despite efforts to prepare the borehole properly prior to cementing, Cement Bond Logs (CBL) commonly reveal poor or no bonding, or poor-quality cement behind casing. Current solutions to achieve mud removal and water wetting include pumping fluids that separate the cement slurry from the drilling fluid. The fluid may be a single-stage, viscous, water-base spacer that contains surfactants or a non-viscous (Newtonian) wash that contains surfactants; both having strong water-wetting tendencies. Or, a two-stage spacer system may be pumped that comprises base oil, solvents, or water-base chemical washes with surfactants, in combination with a viscous water-base spacer that contains water-wetting surfactants.

Proposals have been made in the art to use microemulsions for borehole preparation prior to cementing. See, for example, U.S. patents or applications U.S. Pat. Nos. 5,904,208; 7,380,606; 6,534,449; 7,392,844; 7,318,477; 7,481,273; 7,544,639; US2009/0008091; US2009/0221456; US 2008/0274918; and US 2008/0287324, all hereby incorporated by reference. Pertinent literature references to microemulsions include the following publications. Smith, G., Kumar, P. and Nguyen, D.: "*Formulating Cleaning Products with Microemulsion*", paper number 164, Proceedings 6th World Congress CESIO, Berlin, Germany, Jun. 21-23, 2004; and Van Zanten, R., Lawrence, B., and Henzler, S.: "*Using Surfactant Nanotechnology to Engineer Displacement Packages for Cementing Operations*", paper IADC/SPE 127885, 2010.

SUMMARY

The present document discloses improved wellbore-cleaning compositions and methods for optimal displacement or removal or both of SBM/OBM, thus allowing superior bonding of cement in the annular space between casing and the formation face.

The compositions and methods comprise using a wellbore-cleaning composition comprising a microemulsion to clean a subterranean well borehole and casing prior to cementing. The microemulsion is formed by combining a solvent, a co-solvent, a water-wetting surfactant, a cleaning surfactant, a non-ionic surfactant, a non-ionic co-surfactant, an emulsifying surfactant, and water or brine. These additives may be mixed together to form a single-phase, optically-clear, thermodynamically-stable microemulsion.

The wellbore-cleaning composition may be used alone as a spacer fluid and as a separate stage preceding or following a conventional spacer fluid or scavenger slurry. In addition, the composition may be incorporated within a carrier fluid, and the resulting fluid mixture may be pumped as a spacer fluid.

In an aspect, embodiments relate to wellbore-cleaning compositions that comprise a microemulsion.

In a further aspect, embodiments relate to methods for cleaning a section of a wellbore prior to a cementing operation.

In yet a further aspect, embodiments relate to methods for cementing a subterranean well having a wellbore.

DETAILED DESCRIPTION

Figure 1:
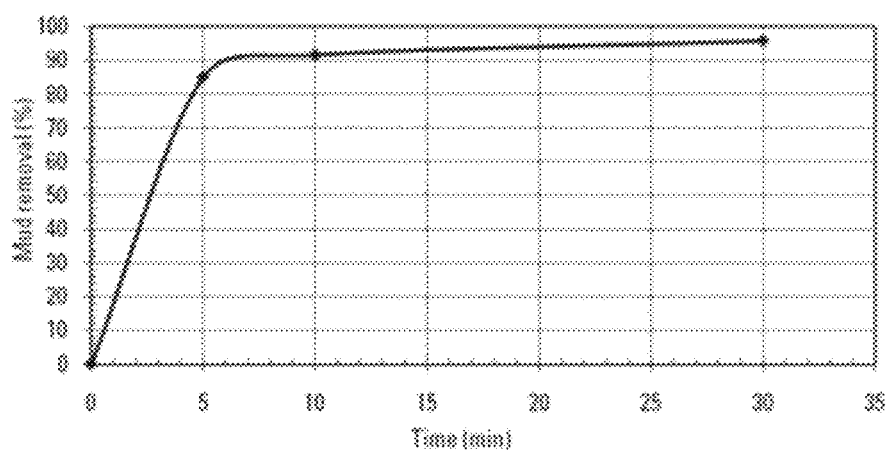
FIG. 1 shows the mud-removal efficiency as measured during grid tests.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the embodiments and should not be construed as a limitation to the scope and applicability of the disclosed embodiments. While the compositions of the present disclosure are described herein as comprising certain materials, it should be understood that the composition could optionally comprise two or more chemically different materials. In addition, the composition can also comprise some components other than the ones already cited.

In the summary and the description, each numerical value should be read once as modified by the term "about" (unless already expressly so modified), and then read again as not so modified unless otherwise indicated in context. Also, in the summary and the detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that the Applicants appreciate and understand that any and all data points within the range are to be considered to have been specified, and that the Applicants have disclosed and enabled the entire range and all points within the range.

Microemulsions are macroscopically homogeneous mixture of oil, water and surfactant. They form upon simple mixing of the components, and do not require the high-shear conditions generally required for creating ordinary emulsions. Microemulsions are thermodynamically, not kinetically, stabilized, and may consist of one, two or three phases. They may consist of oil dispersed in water (O/W) or water dispersed in oil (W/O) emulsions. Microemulsions are generally described as Winsor Type I, II, III or IV emulsions. A system or formulation is defined as: Winsor I when it contains a microemulsion in equilibrium with an excess oil phase; Winsor II when it contains a microemulsion in equilibrium with excess water; Winsor III when it contains a middle phase microemulsion in equilibrium with excess water and excess oil; and Winsor IV when it contains a single-phase microemulsion with no excess oil or excess water. More information about microemulsions and especially about Winsor IV can be found in S. Ezrahi, A. Aserin and N. Garti, "*Chapter 7: Aggregation Behavior in One-Phase (Winsor IV) Microemulsion Systems*", in P. Kumar and K. L. Mittal, ed., *Handbook of Microemulsion Science and Technology*, Marcel Dekker, Inc., New York, 1999, pp. 185-246.

In an aspect, embodiments relate to a wellbore-cleaning composition comprising a microemulsion. The composition may be introduced into the wellbore to displace synthetic-base and/or oil-base drilling fluid, and provide clean and water-wet casing and borehole surfaces prior to cementing. The microemulsion is formed by combining a solvent, a co-solvent, a water-wetting surfactant, a cleaning surfactant, a non-ionic surfactant, a non-ionic co-surfactant, an emulsifying surfactant, and water or brine. The combination may form a thermodynamically stable, optically-clear, single-phase Winsor Type IV microemulsion.

The solvent may be selected from the group of alkyl esters with carbon-chain lengths between 6 and 18. These include, but are not limited to, methyl caprylate/caprate, methyl laurate, methyl myristate, methyl palmitate, methyl oleate, canola methyl ester and soya methyl ester. Of these, methyl caprylate/caprate may be used. The co-solvent may be selected from the group of polyalkylene glycols, e.g. those with inherent biodegradability. The solvent concentration in the microemulsion may be between about 10% and 45% by weight, or between about 40% and 45% by weight. The co-solvent concentration in the microemulsion may be between about 10% and 40% by weight, or between about 15% and 25% by weight.

The water-wetting surfactant may comprise an alkyl polyglycoside. Alkyl polyglycosides having alkyl groups with carbon-chain lengths between about 8 and 10 may be used. The water-wetting-surfactant concentration in the microemulson may be between about 5% and 10% by weight, or between about 6% and 8% by weight.

The cleaning surfactant may comprise an alkyl sulfate including, but not limited to sodium, ammonium, magnesium and amine salts of coco sulfate and lauryl sulfate. Of these, sodium lauryl sulfate may be used. The cleaning-surfactant concentration in the microemulsion may be between about 5% and 20% by weight, or between about 15% and 20% by weight.

The non-ionic surfactant may comprise an alcohol ethoxylate. Of these are alkyl alcohol ethoxylates carbon-chain lengths between about 9 and 11 may be used. The non-ionic cosurfactant may comprise an alcohol alkoxylate, e.g. containing polyethylene groups, polypropylene groups or both. The non-ionic-surfactant concentration in the microemulsion may be between about 1% and 10% by weight, or between about 5% and 8% by weight. The non-ionic co-surfactant concentration in the microemulsion may be between about 1% and 5% by weight, or between about 2.5% and 4.0% by weight.

The emulsifying surfactant may comprise a polysorbate selected from (but not limited to) polyoxyethylene (20) sorbitan monolaurate, polyoxyethylene (20) sorbitan monopalmitate, polyoxyethylene (20) sorbitan monooleate and polyoxyethylene (20) sorbitan monostearate. The oil-solubilizing surfactant may be polyoxyethylene (20) sorbitan monooleate. The emulsifying-surfactant concentration in the microemulsion may be between about 1% and 5% by weight, or between about 1.5% and 3.0% by weight.

Water or brine may be present at concentrations between about 1% and 5% by weight, or between about 2% and 4% by weight.

The wellbore-cleaning composition may further comprise a carrier fluid such as (but not limited to) a conventional water-base spacer fluid or scavenger slurry. Conventional spacer fluids are meant here to encompass also non viscous (Newtonian) wash and even water. Despite being diluted, the microemulsions surprisingly remain intact, and their cleaning capabilities are undiminished. Such microemulsion/carrier fluid mixtures are particularly advantageous from a logistical point of view.

Those skilled in the art will understand that conventional water-base spacer fluids are not microemulsions, and are exemplified by MUDPUSH™ spacers, available from Schlumberger. The conventional water-base spacer fluid may be viscosified and weighted, or viscosified and unweighted, or non-viscosified. Those skilled in the art will also understand that scavenger slurries are aqueous suspensions of solids such as (but not limited to) Portland cement, and frequently contain customary cement additives such as (but not limited to) retarders, accelerators, fluid-loss additives and dispersants. When the wellbore-cleaning composition is incorporated within the carrier fluid (e.g., water-base spacer fluid or scavenger slurry), the microemulsion concentration in the resulting fluid mixture may be between about 5 vol % and 20 vol %, or between about 10 vol % and 15 vol %, or between about 10 vol % and 12 vol %.

The wellbore-cleaning composition, the carrier fluid or both may be viscosified. Non-limiting examples of viscosifying agents suitable for use herein include aluminum phosphate ester, alkyl quarternary ammonium bentonite, alkyl quaternary ammonium montmorillonite, xanthan gum, gelatin, pectin, cellulosic derivatives, gum arabic, guar gum, locust bean gum, tara gum, cassia gum, agar, n-octenyl succinated starch, porous starch, alginates, carrageenates, chitosan, scleroglucan, diutan, welan gum and an organophilic clay such as CLAYTONE™ (available from Southern Clay Products, Inc.; Gonzalez, Tex., USA).

A trimer acid based rheology modifier such as RHEFLAT™ (available from M-I SWACO, Houston, Tex., USA) may be also added to the viscosified wellbore-cleaning composition to achieve a flat rheology profile. Without wishing to be bound by any theory, this compound is believed to enhance low-end viscosity and yield point by interacting with fine solids such as organophillic clay and weighting solids such as calcium carbonate, barite, and hematite. The rheology modifier may be present in an amount of from about 1 to about 5% by weight of the microemulsion.

The density of the wellbore-cleaning composition, the carrier fluid or both may also be adjusted by, for example, adding a suitable weighting agent or lightweight material. Suitable weighting agents include (but are not limited to) barite, an inorganic cement, calcium carbonate, hematite, ilmenite, magnesium tetraoxide and silica. Suitable lightweight materials include (but are not limited to) ceramic microspheres, glass microspheres, uintaite, uintahite, coal and nitrogen. It should be noted that weighting agents such as coarse barite, coarse calcium carbonate or coarse hematite may also be used as weighting agents in the present context. Inorganic cements comprise, but are not limited to, Portland cement, calcium aluminate cement, lime/silica blends, blast furnace slag, fly ash, Sorel cements, chemically bonded phosphate ceramics and geopolymers.

In a further aspect, embodiments relate to a method for cleaning a section of a wellbore prior to a cementing operation, the wellbore having a casing suspended therein, and having been treated with an oil- or synthetic-base drilling fluid. The method comprises pumping the disclosed wellbore-cleaning compositions into the wellbore, thereby providing clean and water-wet casing and borehole surfaces. The clean surface will provide superior bonding of cement to the cleaned surfaces.

The wellbore-cleaning compositions according to the present disclosure may be pumped alone, ahead of a conventional water-base spacer fluid or scavenger slurry and behind a conventional water-base spacer fluid or scavenger slurry. In this disclosure, scavenger slurries will be considered to be a type of spacer fluid. In addition, as previously discussed, the disclosed compositions are also effective when incorporated into a carrier fluid such as (but not limited to) a conventional water-base spacer fluid or scavenger slurry. When the disclosed composition is incorporated within the carrier fluid, the microemulsion concentration in the resulting fluid mixture may be between about 5 vol % and 20 vol %, or between about 10 vol % and 15 vol %, or between about 10 vol % and 12 vol %.

The wellbore-cleaning composition, the carrier fluid or both may be viscosified. Non-limiting examples of viscosifying agents suitable for use herein include aluminum phosphate ester, alkyl quaternary ammonium bentonite, alkyl quaternary ammonium montmorillonite, xanthan gum, gelatin, pectin, cellulosic derivatives, gum arabic, guar gum, locust bean gum, tara gum, cassia gum, agar, n-octenyl succinated starch, porous starch, alginates, carrageenates, chitosan, scleroglucan, diutan, welan gum and an organophilic clay such as CLAYTONE™(available from Southern Clay Products, Inc.; Gonzalez, Tex., USA).

A trimer acid based rheology modifier such as RHEFLAT™ (available from M-I SWACO, Houston, Tex., USA) may be also added to the viscosified wellbore-cleaning composition to achieve a flat rheology profile. Without wishing to be bound by any theory, this compound is believed to enhance low-end viscosity and yield point by interacting with fine solids such as organophillic clay and weighting solids such as calcium carbonate, barite, and hematite. The rheology modifier may be present in an amount of from about 1 to about 5% by weight of the microemulsion.

The density of the wellbore-cleaning composition, the carrier fluid or both may also be adjusted by, for example, adding a suitable weighting agent or lightweight material. Suitable weighting agents include (but are not limited to) barite, an inorganic cement, calcium carbonate, hematite, ilmenite, magnesium tetraoxide and silica. Suitable lightweight materials include (but are not limited to) ceramic microspheres, glass microspheres, uintaite, uintahite, coal and nitrogen. It should be noted that weighting agents such as coarse barite, coarse calcium carbonate or coarse hematite may also be used as weighting agents in the present context. Inorganic cements comprise, but are not limited to, Portland cement, calcium aluminate cement, lime/silica blends, blast furnace slag, fly ash, Sorel cements, chemically bonded phosphate ceramics and geopolymers.

In yet a further aspect, embodiments relate to methods for cementing a subterranean well having a borehole. The wellbore has a casing suspended therein and contains, or has been treated with, an oil-base or synthetic-base drilling fluid. The method comprising (i) providing the disclosed wellbore-cleaning composition that comprises a microemulsion, (ii) pumping the composition into the region between the casing and the wellbore, (iii) providing a cement slurry, and (iv) pumping the cement slurry into the region between the casing and the wellbore. The wellbore-cleaning composition removes the drilling fluid from the region between the casing and the wellbore, thereby providing clean and water-wet casing and borehole surfaces.

The wellbore-cleaning composition according to the present disclosure may be pumped alone, ahead of a conventional water-base spacer fluid or scavenger slurry and behind a conventional water-base spacer fluid or scavenger slurry. In this disclosure, scavenger slurries will be considered to be a type of spacer fluid. In addition, as mentioned previously, the disclosed wellbore-cleaning compositions are also effective when incorporated into a carrier fluid such as (but not limited to) a conventional water-base spacer fluid or scavenger slurry. The resulting fluid mixture may be pumped as a spacer fluid. Such mixtures are particularly advantageous from a logistical point of view. When the wellbore-cleaning composition is incorporated within the carrier fluid (e.g., water-base spacer fluid or scavenger slurry), the microemulsion concentration in the resulting fluid mixture may be between about 5 vol % and 20 vol %, or between about 10 vol % and 15 vol %, or between about 10 vol % and 12 vol %.

The wellbore-cleaning composition, the carrier fluid or both may be viscosified. Non-limiting examples of viscosifying agents suitable for use herein include aluminum phosphate ester, alkyl quaternary ammonium bentonite, alkyl quaternary ammonium montmorillonite, bentonite, an inorganic cement, xanthan gum, gelatin, pectin, cellulosic derivatives, gum arabic, guar gum, locust bean gum, tara gum, cassia gum, agar, n-octenyl succinated starch, porous starch, alginates, carrageenates, chitosan, scleroglucan, diutan, welan gum and an organophilic clay such as CLAYTONE™ (available from Southern Clay Products, Inc., Gonzalez, Tex., USA).

A trimer acid based rheology modifier such as RHEFLAT™ (available from M-I SWACO, Houston, Tex., USA) may be also added to the viscosified wellbore-cleaning composition to achieve a flat rheology profile. Without wishing to be bound by any theory, this compound is believed to enhance low-end viscosity and yield point by interacting with fine solids such as organophillic clay and weighting solids such as calcium carbonate, barite, and hematite. The rheology modifier may be present in an amount of from about 1 to about 5% by weight of the microemulsion.

The density of the wellbore-cleaning composition, the carrier fluid or both may also be adjusted by, for example, adding a suitable weighting agent or lightweight material. Suitable weighting agents include (but are not limited to) barite, an inorganic cement, calcium carbonate, hematite, ilmenite, magnesium tetraoxide and silica. Suitable lightweight materials include (but are not limited to) ceramic microspheres, glass microspheres, uintaite, uintahite, coal and nitrogen. It should be noted that weighting agents such as coarse barite, coarse calcium carbonate or coarse hematite may also be used as weighting agents in the present context. Inorganic cements comprise, but are not limited to, Portland cement, calcium aluminate cement, lime/silica blends, blast furnace slag, fly ash, Sorel cements, chemically bonded phosphate ceramics and geopolymers.

The density of the spacer fluid may be equal to or greater than the density of the SBM/OBM, and equal to or less than the density of the cement slurry.

In all embodiments, the present microemulsions may also be used as a "chemical wash" which is to say pumping an aqueous solution containing the microemulsions as disclosed herein. Said operation might be done after a drilling fluid but before a conventional spacer or scavenger or it can be done after a conventional spacer or scavenger has been pumped.

EXAMPLES

The following examples serve to illustrate the embodiments.

Spacer Fluid Preparation

A microemulsion was formulated for optimal removal of synthetic oil-base-mud ahead of primary cementing operations. Comprising a mixture of solvents, surfactants and water, the resulting microemulsion was a translucent fluid with the solvent portion as the external phase. The microemulsion composition comprised the ingredients shown in Table 1.

TABLE 1

| Microemulsion composition. | |
|---|---|
| Compounds | Concentration (wt %) |
| $C_{6-18}$ Methyl Ester | 43.24 |
| Polyalkylene Glycol | 21.62 |
| Sorbitan Monooleate 20 | 1.62 |
| Sodium Lauryl Sulfate | 16.22 |
| $C_{9-11}$ Alcohol Ethoxylate | 5.41 |
| Alcohol Alkoxylate | 2.70 |
| $C_{8-10}$ Alkyl Polyglycoside | 6.49 |
| Deionized Water | 2.70 |
| Total | 100.0 |

For the following examples, the microemulsion was added to a conventional spacer fluid—MUDPUSH™ II, available from Schlumberger. The spacer-fluid density was 1.74 kg/L (14.5 lbm/gal), and composition is shown in Table 2. The concentration of the microemulsion in the microemulsion/spacer-fluid mixture was 10 vol %.

TABLE 2

| Spacer-fluid composition. | |
|---|---|
| Item | Concentration |
| Fresh Water | |
| MUDPUSH ™ II Additive | 14.2 g/L (5 lbm/bbl $H_2O$) |
| Polyethylene Glycol Antifoam Agent | 0.6 mL/L (0.1 gal/bbl $H_2O$) |

TABLE 2-continued

| Spacer-fluid composition. | |
|---|---|
| Item | Concentration |
| Microemulsion (from Table 1) | 26.3 mL/L (4.2 gal/bbl $H_2O$) |
| Barite | 967 g/L (340.1 lbm/bbl $H_2O$) |

The base spacer fluid (without microemulsion or barite) was prepared in a Waring™ blender using a 1-L blender bowl. The fluid was mixed for 5 minutes at 4,000 RPM. The base fluid was transferred to a 1-L beaker, and a 5-cm diameter impeller-blade stirring device was lowered into the fluid. The mixing speed varied from 500 to 600 RPM, sufficient to create a vortex in the fluid. The barite was added to the fluid, and stirring continued for 30 minutes. The microemulsion was then added, and stirring continued for an additional 10 minutes.

Synthetic Mud Composition

The synthetic mud used in the examples was RHELIANT™, available from M-I SWACO, Houston, Tex., USA. The mud density was 1.52 kg/L (12.7 lbm/gal).

Test Methods

Casing Water Wetting Test (CWWT)

The Casing Water Wetting Test was employed to determine the mud-removal effectiveness of the surfactant. The test was performed with 4-in. by 1-in. (10.2-cm by 2.54-cm) casing coupons. The procedure is as follows.

The spacer was preheated to 150° F. (65.5° C.) for 30 minutes, and transferred to a cup from a Chan 35 rotational viscometer (available from Chandler Engineering, Broken Arrow, Okla., USA).

A casing coupon was statically submerged for 10 minutes in 1.52-kg/L (12.7-lbm/gal) synthetic oil-base mud, also preheated to 150° F. (65.5° C.).

The coupon was removed from the oil-base mud, and the convex face of the coupon was cleaned with paper.

The coupon was transferred to the viscometer cup containing the spacer. With the mud-covered face facing the inside of the cup, the coupon was fixed inside the cup such that the lower ⅔ was submerged in the spacer.

The viscometer rotor, without the bob, was lowered into the spacer fluid in the cup. The rotor was then operated at 100 RPM for 30 minutes.

The coupon was removed, and the qualitative evaluation of water wetting proceeded. A piece of Teflon tape (as it closely represents an oil-wet surface) was placed on the coupon. A 20-microliter drop of distilled water was placed on the surfaces of the Teflon tape, the untreated oil-wet area of coupon, and the ⅔ of the coupon that had been submerged in the spacer. The diameters of the droplets were measured.

The diameter ratio between the droplet on Teflon (D1) and that on the spacer-treated surface (D2) was calculated. Then, the guideline shown in Table 3 was used to determine the contact angle and the water wettability.

TABLE 3

Guideline for the Contact Angle and Water Wettability

| Diameter ratio, D2/D1 | Contact Angle (degrees) | Water Wettability |
|---|---|---|
| 1 | 150 | Poor Wetting > 90° |
| 1.3 | 90 | 90°< Fair Wetting > 30° |
| 2.1 | 30 | Good Wetting < 30° |
| 2.9 | 15 | |
| 6.5 | 0 | |

Grid Test

The grid test measures the capability of a surfactant to remove a gelled layer of mud with gentle erosion. A 30-mesh metallic grid was placed over a closed rotor on a Chan 35 viscometer. The grid and rotor assembly were weighed and recorded as $W_1$. The grid and rotor assembly were then covered for 10 minutes with 1.52-kg/L (12.7-lbm/gal) synthetic oil-based mud, preheated to 150° F. (65.5° C.). They were removed, weighed and recorded as $W_2$. The grid and rotor assembly were reattached to the viscometer and submerged in spacer fluid, also preheated to 150° F. (65.5° C.), and rotated at 100 RPM for 30 minutes. They were then removed, weighed and recorded as $W_3$. The mud removal percentage (%) was calculated by the following equation.

$$\text{Mud Removal (\%)} = \left[1 - \frac{(W_3 - W_1)}{(W_2 - W_1)}\right] \times 100$$

Wettability Test (Reverse Emulsion Test)

The spacer and mud were conditioned at 150° F. (65.5° C.) for 20 minutes in atmospheric consistometers. Then, the spacer was placed in a heated Waring-blender bowl, equipped with a conductivity probe and meter. Sufficient spacer was added to cover the probe and reset the conductivity meter to 3.0 mA. The spacer was removed from the blender bowl, and 250 mL of synthetic oil-based mud (SBM) were placed in the preheated Waring blender, and agitated for 2 minutes at a speed sufficient to observe a visible vortex. The spacer was slowly added to the SBM in 10- to 20-mL increments. The conductivity value of the mixture was observed and recorded after each increment. When the total volume of mud and spacer reached 500 mL, 250 mL of the SBM-spacer mixture were removed. The remaining 250 mL of SBM-spacer mixture were agitated for 2 minutes at 150° F. (65.5° C.), again at a speed sufficient to observe a vortex. Then, additional spacer was added in 10- to 20-mL increments until the 3.0 mA reading was attained.

Example 1

Casing Water-Wetting

Casing water wetting was evaluated, and the results are tabulated in Table 4. The results show that the spacer containing the microemulsion provided good water-wetting properties (as demonstrated by contact angles of 15° and 23°) while cleaning the RHELIANT™ mud from the casing coupons.

TABLE 4

Casing Water Wetting Results

| | Spacer Fluid and RHELIANT ™ Mud |
|---|---|
| Water Droplet on Teflon, D1 | 0.6 |
| Droplet on Treated Side, D2 | 1.7 |
| Diameter Ratio, D2/D1 | 2.83 |
| Contact Angle Result | 16° |
| Water-Wettability Result | Good Wetting |

Example 2

Grid Cleaning

The results of the grid tests are provided in FIG. 1, and show mud removal efficiency of about 97% with the RHELIANT™ mud. Most of the mud was removed within about 5 min.

Example 4

Wettability (Reverse Emulsion)

Figure 2:
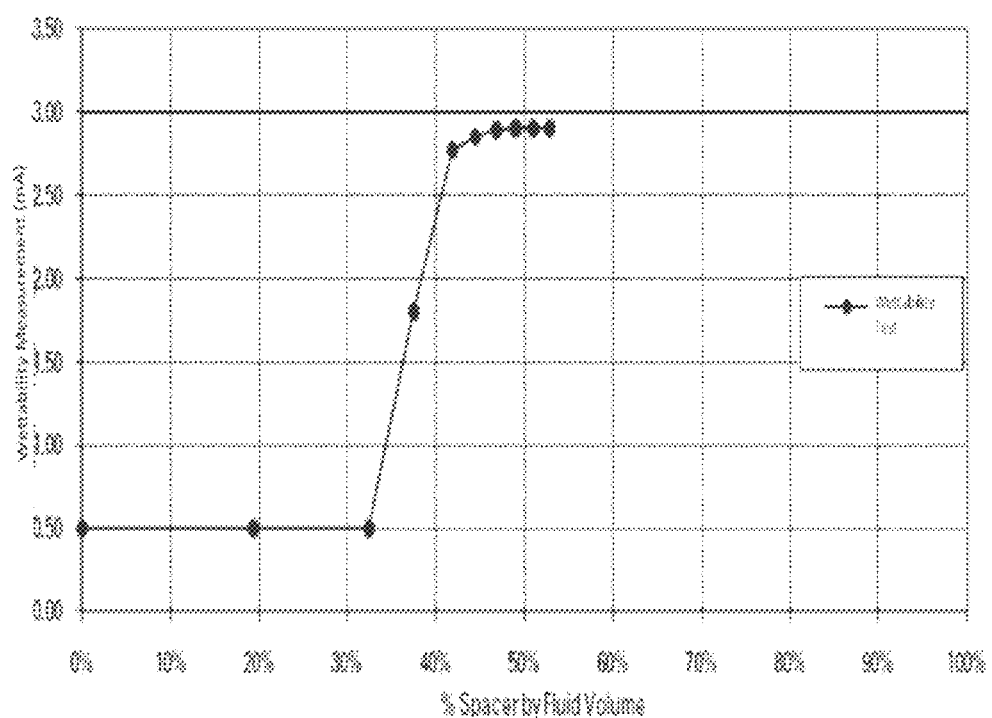
FIG. 2 shows the results of wettability tests.

A spacer volume of about 47% was required to reach the 3-mA set point using the RHELIANT™ mud sample. According to the method, the span was adjusted to obtain a reading of 3 mA for the neat spacer. With a water-base spacer, this value was then used to indicate when the spacer/mud mixture had inverted to a water-wet state. However, the accuracy of the test when using an oil-outside-phase spacer fluid has not been determined. No oil-film residue was observed when the mixer bowl was gently rinsed with a gentle stream of water. Results are shown in FIG. 2.

The invention claimed is:

1. A method for cleaning a section of a wellbore prior to a cementing operation, the wellbore having a casing suspended therein, and containing or having been treated with an oil- or synthetic-base drilling fluid, the method comprising:
   pumping a wellbore-cleaning composition into the wellbore, the composition comprising a microemulsion, the microemulsion comprising a solvent, a co-solvent, a water-wetting surfactant, a cleaning surfactant, a non-ionic surfactant, a non-ionic co-surfactant, an emulsifying surfactant and an aqueous fluid,
   wherein the microemulsion comprises:
   10%-45% by weight solvent
   10%-40% by weight co-solvent;
   5%-10% by weight water-wetting surfactant;
   5%-20% by weight cleaning surfactant;
   1%-10% by weight non-ionic surfactant;
   1%-5% by weight non-ionic co-surfactant
   1%-5% by weight emulsifying surfactant; and
   1%-5% by weight aqueous fluid.
2. The method of claim 1, wherein the solvent comprises an alkyl ester, the co-solvent comprises a polyalkylene glycol, the water-wetting surfactant comprises an alkyl polyglycoside, the cleaning surfactant comprises an alkyl sulfate, the emulsifying surfactant comprises a polysorbate, the non-ionic surfactant comprises an alcohol ethoxylate, and the non-ionic co-surfactant comprises an alcohol alkoxylate.
3. The method of claim 1, wherein the composition further comprises a viscosifying agent that comprises one or more members selected from the group consisting of aluminum phosphate ester, bentonite, alkyl quarternary ammonium bentonite, alkyl quaternary ammonium montmorillonite, an inorganic cement, xanthan gum, gelatin, pectin, cellulosic derivatives, gum arabic, guar gum, locust bean gum, tara gum, cassia gum, agar, n-octenyl succinated starch, porous starch, alginates, carrageenates, chitosan, scleroglucan, diutan, welan gum and an organophilic clay.

4. The method of claim 1, wherein the composition is pumped into the wellbore by itself, diluted in water, ahead of a conventional spacer fluid or scavenger slurry, behind a conventional spacer fluid or scavenger slurry, or is incorporated into a carrier fluid.

5. The method of claim 4, wherein the carrier fluid comprises an aqueous fluid and a viscosifying agent that comprises one or more members selected from the group consisting of aluminum phosphate ester, bentonite, alkyl quarternary ammonium bentonite, alkyl quaternary ammonium montmorillonite, an inorganic cement, xanthan gum, gelatin, pectin, cellulosic derivatives, gum arabic, guar gum, locust bean gum, tara gum, cassia gum, agar, n-octenyl succinated starch, porous starch, alginates, carrageenates, chitosan, scleroglucan, diutan, welan gum and an organophilic clay.

6. The method of claim 4, wherein the microemulsion concentration in the carrier fluid/microemulsion mixture is between about 5 vol % and 20 vol %.

7. A method for cementing a subterranean well having a wellbore, the wellbore having a casing suspended therein, and containing or having been treated with an oil-base or synthetic-base drilling fluid, comprising:
 (i) providing a wellbore-cleaning composition comprising a microemulsion, the microemulsion comprising a solvent, a co-solvent, a water-wetting surfactant, a cleaning surfactant, a non-ionic surfactant, a non-ionic co-surfactant, an emulsifying surfactant and an aqueous fluid;
 (ii) pumping the composition into the region between the casing and the wellbore;
 (iii) providing a cement slurry; and
 (iv) pumping the cement slurry into the region between the casing and the wellbore,
 wherein the microemulsion comprises:
 10%-45% by weight solvent
 10%-40% by weight co-solvent;
 5%-10% by weight water-wetting surfactant;
 5%-20% by weight cleaning surfactant;
 1%-10% by weight non-ionic surfactant;
 1%-5% by weight non-ionic co-surfactant
 1%-5% by weight emulsifying surfactant; and
 1%-5% by weight aqueous fluid.

8. The method of claim 7, wherein the solvent comprises an alkyl ester, the co-solvent comprises a polyalkylene glycol, the water-wetting surfactant comprises an alkyl polyglycoside, the cleaning surfactant comprises an alkyl sulfate, the emulsifying surfactant comprises a polysorbate, the non-ionic surfactant comprises an alcohol ethoxylate, and the non-ionic co-surfactant comprises an alcohol alkoxylate.

9. The method of claim 7, wherein the composition further comprises a viscosifying agent that comprises one or more members selected from the group consisting of aluminum phosphate ester, bentonite, alkyl quarternary ammonium bentonite, alkyl quaternary ammonium montmorillonite, an inorganic cement, xanthan gum, gelatin, pectin, cellulosic derivatives, gum arabic, guar gum, locust bean gum, tara gum, cassia gum, agar, n-octenyl succinated starch, porous starch, alginates, carrageenates, chitosan, scleroglucan, diutan, welan gum and an organophilic clay.

10. The method of claim 7, wherein the composition is pumped into the wellbore by itself, diluted in water, ahead of a conventional spacer fluid or scavenger slurry, behind a conventional spacer fluid or scavenger slurry, or is incorporated into a carrier fluid.

11. The method of claim 10, wherein the carrier fluid comprises an aqueous fluid and a viscosifying agent comprising one or more members selected from the group consisting of aluminum phosphate ester, bentonite, alkyl quarternary ammonium bentonite, alkyl quaternary ammonium montmorillonite, an inorganic cement, xanthan gum, gelatin, pectin, cellulosic derivatives, gum arabic, guar gum, locust bean gum, tara gum, cassia gum, agar, n-octenyl succinated starch, porous starch, alginates, carrageenates, chitosan, scleroglucan, diutan, welan gum and an organophilic clay.

12. The method of claim 10, wherein the microemulsion concentration in the carrier fluid/microemulsion mixture is between about 5 vol % and 20 vol %.

\* \* \* \* \*